No. 783,721. Patented February 28, 1905.

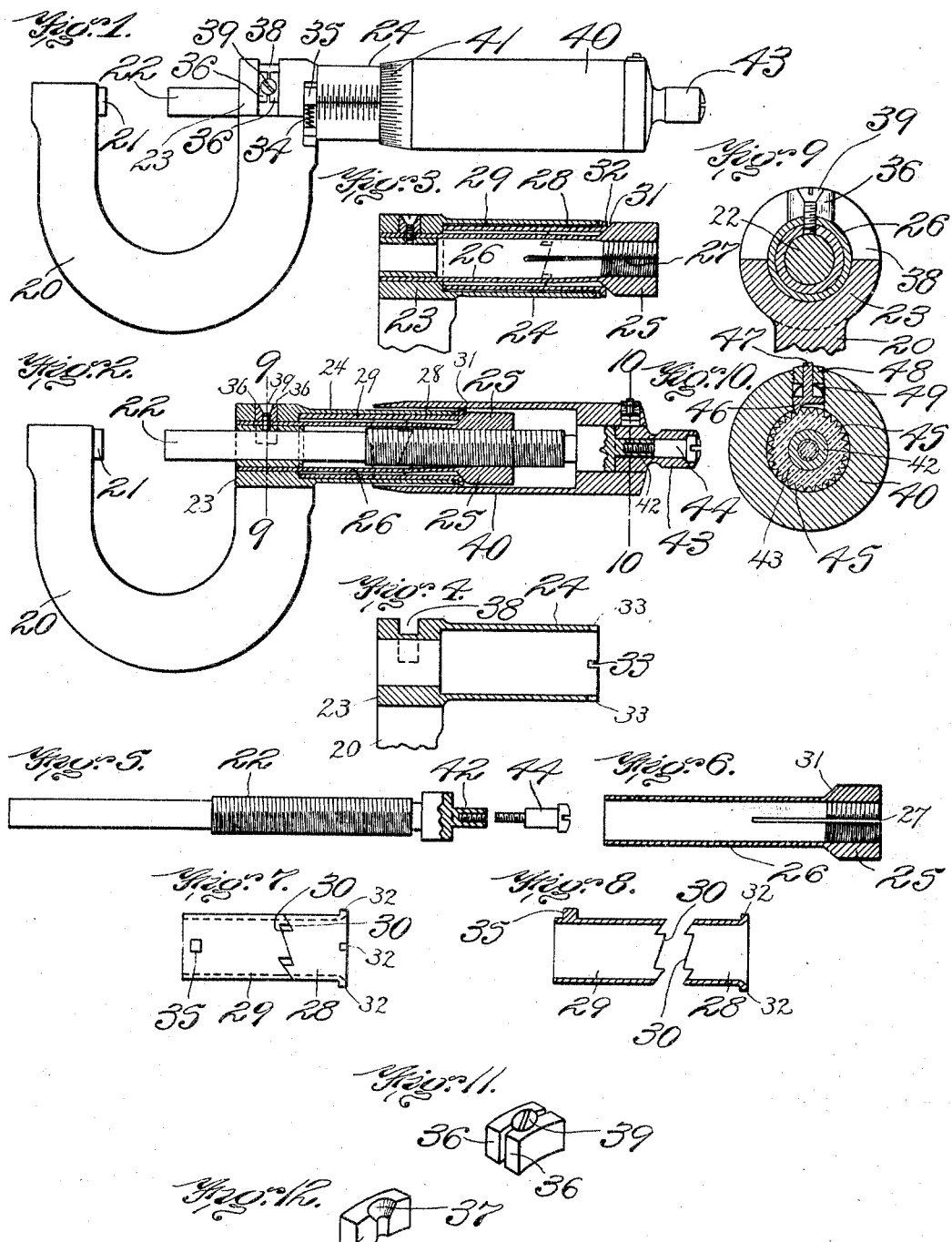

UNITED STATES PATENT OFFICE.

EDWARD C. CLAPP, OF ATHOL, MASSACHUSETTS.

MICROMETER-GAGE.

SPECIFICATION forming part of Letters Patent No. 783,721, dated February 28, 1905.

Application filed July 23, 1904. Serial No. 217,775.

*To all whom it may concern:*

Be it known that I, EDWARD C. CLAPP, of Athol, in the county of Worcester and State of Massachusetts, have invented certain new and useful Improvements in Micrometer-Gages, of which the following is a specification.

This invention has for its object to provide certain improvements in micrometer gages or calipers looking to the quick adjustment of the micrometer-screw in changing it from one position to another and the regulation of the screw for the purpose of compensating for wear of the end of the screw and of the accompanying bearing and generally to the convenience of operation and effectiveness of the device.

The invention consists in the several improvements which I will now proceed to describe and claim.

Of the accompanying drawings, forming a part of this specification, Figure 1 represents a side elevation of a micrometer-gage embodying my invention. Fig. 2 represents a longitudinal section of the same. Fig. 3 represents a view similar to a portion of Fig. 2, certain parts being removed. Fig. 4 represents a view similar to a portion of Fig. 3, certain additional parts being removed. Fig. 5 represents a side view of the micrometer-screw. Fig. 6 represents a sectional view of the micrometer-nut. Figs. 7 and 8 represent, respectively, a side view and a sectional view of the means for closing the micrometer-nut. Fig. 9 represents a section on line 9 9 of Fig. 2. Fig. 10 represents a section on line 10 10 of Fig. 2. Fig. 11 represents a perspective view of the locking ear or lug hereinafter referred to. Fig. 12 represents a perspective view of a part of said lug.

The same numerals of reference indicate the same parts in all the figures.

In the drawings, 20 represents the U-shaped frame or body of a micrometer-gage, the same having the usual fixed stud or anvil 21, which is opposed to the micrometer-screw 22. The frame or body 20 is provided with a hub 23, from which projects a hollow or tubular sleeve 24, preferably integral with the hub 23.

25 represents the micrometer-nut, which is formed on one end of a tube 26 and is internally threaded to engage the threaded portion of the micrometer-screw 22. The nut and a portion of the tube 26 is provided with longitudinal slots 27, which subdivide the nut into a series of spring-sections which normally spring outwardly enough to open the nut and disengage it from the micrometer-screw. The nut-supporting tube 26 projects into the opening of the hub 23 and is adjustably secured to said hub by means hereinafter described.

28 29 represent two tube-sections which are interposed between the nut-supporting tube 26 and the fixed sleeve or casing 24. The meeting ends of said sections are provided with inclined faces 30, Figs. 7 and 8, which are so formed and arranged that a partial rotation of the section 29 will impart an endwise movement to the section 28. The outer end of the section 29 bears against the hub 23 and is prevented by the latter from moving endwise toward the hub. The outer end of the section 28 bears against a beveled shoulder 31, formed on the outer surface of the nut 25. When the section 29 is rotated in one direction, it imparts a longitudinal movement to the section 28 in the direction required to cause said section to close the nut 25 upon the micrometer-screw, this action being due to the coöperation of the section 29 with the beveled face 31 on the micrometer-nut. The section 28 is prevented from rotating by means of lugs 32, formed on its outer portion, said lugs entering slots 33, Fig. 4, formed in the outer end of the sleeve 24. The section 29 is normally held by a spring 34, Fig. 1, in position to cause the closing of the nut 25, said spring being interposed between an ear 35, affixed to the section 29, and one end of a recess formed in the hub 23, the spring tending to hold the ear 35 yieldingly against the opposite end of said recess, so that the nut 25 is normally engaged with the micrometer-screw.

In case it is desired to disengage the nut from the screw to permit a rapid extended movement of the latter the ear 35 is pressed by the operator's thumb or finger in the direction required to compress the spring, and so rotate the section 29 as to permit the section 28 to move toward the hub 23. The sections of the nut 25 are thus permitted to spring outwardly, the beveled face 31 crowding against the section 28 and moving it toward the hub 23. The nut is thus disengaged from the micrometer-screw, and the latter may be moved freely any extent required.

It sometimes becomes necessary to adjust the screw of a micrometer-gage to compensate for wear at its outer end and of the opposed end of the anvil 21. To permit this adjustment, I connect the nut-supporting sleeve 26 adjustably and detachably with the hub 23 in such manner that the nut and sleeve may be rotated in the hub to effect any change in the position of the micrometer-screw that may be required to compensate for wear of the parts contacting with the work—viz., the opposed ends of the screw and anvil. To this end I provide the nut-supporting sleeve 26 with a two-part expansible ear composed of sections 36 36, which are placed side by side in a slot 38, formed in the hub 23. The sections 36 are provided in their inner faces with tapering cavities 37, which receive the tapering head of a screw 39, which is screwed into the tube 26. When the said screw is turned inwardly, its tapering head presses the sections 36 36 apart and causes them to bind on the edges of the slot 38, thus securing the tube 26 firmly to the hub 23. When the screw 39 is loosened, the sections 36 36 release their frictional hold on the edges of the slot 38 and permit the rotation of the tube 26 and of the micrometer-nut formed thereon. This rotation when effected while the nut is engaged with the micrometer-screw causes an endwise adjustment of the latter relatively to the nut.

40 represents the usual external tube or barrel which is affixed to the outer portion of the micrometer-screw and rotates therewith, the said barrel having a graduated inner end 41, which coöperates with a graduated outer surface of the tube 24, affixed to the hub 23, as usual in devices of this character. The outer end of the micrometer-screw is provided with a stud 42, which is surrounded by the outer portion of the barrel 40, the latter projecting from the screw, as shown in Fig. 2. Upon the stud 42 is fitted to rotate a handle or thumbpiece 43, said handle being secured to the micrometer-screw by a screw 44, having a reduced threaded portion engaged with a tapped socket in the stud 42 and a head engaging an internal shoulder in the handle 43. The handle 43 is provided with ratchet-teeth 45 on the periphery of its inner end, said teeth engaging a pawl 46, connected with the projecting portion of the barrel 40. The pawl 46 is formed on a stud 47, adapted to slide in a nut or bushing 48, engaged with a threaded orifice in the said projecting portion. The pawl is pressed inwardly by a spring 49, interposed between the pawl and the nut 48, the said spring holding the pawl in yielding engagement with the ratchet-teeth 45. The described pawl-and-ratchet connection between the handle 43 and the barrel 40 enables the barrel and the micrometer-screw to which it is affixed to be rotated by a forward rotary movement of the handle until the end of the micrometer-screw bears on the work and the latter bears on the anvil. The form of the ratchet-teeth is such that when the screw and anvil engage the work the ratchet will slip on the pawl, so that the pressure exerted by the screw and anvil on the work is reduced to the minimum. The ratchet-teeth are so formed that when the handle 43 is backwardly rotated they will operatively engage the pawl and impart a backward rotation to the barrel and screw.

I claim—

1. A micrometer-gage comprising a frame or body, a self-opening split nut connected with said frame, a micrometer-screw extending through said nut, and automatic means for compressing said nut to close it upon the screw.

2. A micrometer-gage comprising a frame or body, a self-opening split nut connected with said frame, a micrometer-screw extending through said nut, automatic means for compressing said nut to engage it with the screw, and means for releasing the nut to permit its disengagement from the screw.

3. A micrometer-gage comprising a frame or body, a self-opening split nut connected with said frame and having a beveled face or shoulder, and nut closing and releasing means comprising two tube-sections having cam-shaped meeting ends, one of said sections being rotatable and the other reciprocatory, and a spring engaged with the rotatable section, to press the reciprocatory section against the beveled shoulder on the nut, the rotatable section having a handle or projection whereby it may be moved against the pressure of the spring.

4. A micrometer-gage comprising a frame or body, and a micrometer-nut which is rotatable in the frame to compensate for wear of the surfaces contacting with the work.

5. A micrometer-gage comprising a frame or body, a micrometer-nut having a supporting-tube, a micrometer-screw extending through said nut, and means for detachably securing the nut-supporting tube to the frame, whereby when said tube is released the nut may be rotated to compensate for wear of the surfaces contacting with the work.

6. A micrometer-gage comprising a frame or body, a micrometer-nut having a supporting-tube, a micrometer-screw extending through said nut, and an expansible ear or lug secured to the tube and located in a slot in the frame, the sides of said lug being adapted to engage the side of the slot, and engage the tube and nut with the frame.

7. A micrometer-gage comprising a frame or body, a micrometer-nut connected with said frame, a micrometer-screw extending through said nut, an outer tube or barrel affixed to the screw and projecting from one end thereof, an operating-handle loosely rotatable on the screw within said projecting end, and provided with a ratchet, and a spring-pawl connected with the projecting portion of the barrel and engaging said ratchet.

In testimony whereof I have affixed my signature in presence of two witnesses.

EDWARD C. CLAPP.

Witnesses:
 HARRY M. BUTLER,
 ANDREW J. HAMILTON.